Patented Oct. 27, 1925.

1,559,054

UNITED STATES PATENT OFFICE.

ARTHUR WESLEY SMITH, OF BALTIMORE, MARYLAND, ASSIGNOR OF ONE-HALF TO WILLIAM W. VARNEY, OF BALTIMORE, MARYLAND.

METHOD OF MANUFACTURE OF PREPARED CHARCOAL.

No Drawing. Application filed March 10, 1920. Serial No. 364,613.

*To all whom it may concern:*

Be it known that I, ARTHUR WESLEY SMITH, a citizen of the United States, residing at Baltimore city, in the State of Maryland, have invented a new and useful Method of Manufacture of Prepared Charcoal, of which the following is a specification.

The object of my invention is the production of a prepared charcoal for de-coloring, de-odorizing and absorptive purposes.

A further object of my invention is the production of a new product comprising a prepared charcoal having its structure intimately impregnated with a metal or metals in a free and elemental form and which cannot be separated mechanically for de-coloring, de-odorizing and absorptive purposes.

A further object of my invention is an improved method of making a de-coloring, de-odorizing and absorptive material.

A further object of my invention is an improved method of making a prepared charcoal having its structure intimately impregnated with a metal or metals in a free and elemental form and which cannot be separated mechanically.

A further object of my invention is an improved method of making a prepared charcoal having its structure intimately impregnated with a metal or metals in a free and elemental form and which cannot be separated mechanically, and the purification of the same.

A further object of my invention is an improved method of de-coloring, de-odorizing and absorptive treatment of syrups, sugars, fats, oils, lactic acid, glycerine, etc.

With the foregoing and other objects in view, my invention consists of the novel product, its manufacture and use of the same as hereinafter set forth, but it is to be understood that changes, variations and modifications may be resorted to which come within the scope of the claims hereunto appended.

I have invented certain ways, methods and processes of preparing, making and treating animal and vegetable charcoals whereby are produced charcoals having great bleaching, de-colorizing, de-odorizing and absorptive powers, for undesirable coloring matters, gums, pectins, proteins and volatile gaseous matters, such as odors, etc., in syrups, sugars, glycerine, fats, oils, etc.

These properties are present in a slight degree in bone black which is by my treatment greatly increased in power and the vegetable charcoals which possess little if any of these desirable properties, are so changed in this respect as to have many times the bleaching, de-colorizing, de-odorizing and absorptive powers that are found in the best grade of bone black.

My invention consists in one application of the same to the proper burning and heat treatment of crude organic material or materials, to which have been added certain metallic salts or compounds, singly or combined, the reduction of these metallic salts or compounds to a metallic or elemental state whilst forming an integral part of the carbon structure, by reducing agents and with subsequent necessary purification.

I have discovered that any organic material or materials which will yield a charcoal upon burning is adaptable to and suitable for the production of highly efficient de-colorizing, de-odorizing and absorptive charcoal.

I have discovered that the proper application and control of the heat upon the crude organic material is a determining factor in the production of a charcoal having these above mentioned desirable properties.

I have discovered that when nickel, palladium platinum, copper, zinc, osmium, thorium or aluminum, in the metallic form are evenly distributed throughout the crude material so as to become an integral part of the charcoal formed upon the burning, in the metallic form, they greatly increase the de-colorizing, de-odorizing and absorptive properties of the resultant product.

I have discovered that after proper burning and heat treatment and processing with the above mentioned metals and their salts and compounds, the preferable way to properly treat and purify the resulting charcoal to obtain the highest degree of action.

I will now describe one method of heat treatment, burning with impregnation of metallic compound and purification, using as the crude organic material a mixture of molasses and white pine sawdust and as the metallic compound, nickel nitrate, although I do not limit myself to the crude organic material to be used other than it shall yield a charcoal upon burning, or to the metallic salt or compound used or to the degree of temperature employed.

*Impregnation with metallic salt.*—Two per cent by weight, of nickel nitrate, calculated on the amount of the crude organic material or materials used is dissolved in sufficient water, say fifty per cent by weight of said materials to moisten completely the crude material, the molasses say twenty-five per cent of the said material by weight is dissolved therein and this solution is thoroughly mixed with the white pine sawdust by kneading. I do not limit myself to any of the above materials or percentages; these percentages have been found to yield satisfactory results and for economic reasons represents well balanced proportions, yielding a charcoal containing about four per cent of nickel.

*Carbonization.*—The mixture is packed in a retort which has preferably a small opening to permit the products of destructive distillation to pass off, placed in a furnace and heated at 700 deg. F. for 30 minutes, or until all the gases and vapors have passed off; the temperature is then gradually raised to 1300 deg. F. and held at this temperature for one hour. The retort is then withdrawn from the furnace and allowed to cool before opening.

During the last period of heating at 1300 deg. F. hydrogen is passed through the contents of the retort, to form metallic nickel or a reducing agent in the solid form may be added to the crude material before packing in the retort. I do not limit myself either to the temperatures of the heat treatments, to the manner in which the reducing agent is added or to the form which the metallic substances assume in the charcoal, or at what stage said metallic substance should be formed before the purification. Each method and way has its advantages, but in the particular materials used in this description hydrogen is used.

*Purification of impregnated carbon.*—The charge from the retort is finally pulverized by well known methods and sifted through a sieve having say, 120 meshes to the linear inch, heated with a dilute aqueous alkaline solution until the boiling point is reached and then filtered and washed free from alkali. This treatment frees the charcoal from phenols, tars and other pyrogenic matter which interferes with the desired action. I do not limit myself to the alkali used or to the strength of the solution used. In this particular case a two per cent solution of sodium hydroxide acts efficiently. The wet charcoal is then mixed with a dilute acid solution, filter pressed and the resulting filter cake dried. I do not limit myself to the acid used or the strength of solution used. In this particular case, a two per cent solution of hydrochloric acid is used. Sulphuric or phosphoric acids will also act effectively.

The material or prepared charcoal as obtained above is used on the material to be treated either as a filtering material or mixed with said material then heated, to say 176–212 deg. F. and filtered out, a higher efficiency is ordinarily obtained by allowing a space of time to elapse before filtering, say 30 minutes with agitation.

Having thus described my invention, what I claim and desire to secure by Letters Patent is—

1. The process of manufacturing a decoloring, de-ordorizing, and absorptive material comprising, impregnating the structure of a vegetable fibrous substance with a compound of a metallic element, reducing the said structure to charred condition, and, reducing said compound of said metallic element to its elementary form within the structure of the said charred vegetable fibrous substance thereby rendering free said metal within said structure.

2. The process of manufacturing prepared charcoal consisting of impregnating the structure of carbonaceous substance with a solution of a compound of a metallic element then heating the same in two stages, first; to a temperature and for a period of time to render said structure fixed without breaking the same down, thus producing destructive distillation in the case of wood from 600 to 800 degrees F. for a period of from 15 to 45 minutes, then to a temperature to insure complete charring and necessary to elminate the pyrogenic substances without destroying the original structure in the case of wood between 1200 and 1400 degrees F. for a period of from 45 minutes to 90 minutes, during this last period reducing the metallic compound within said structure to its elementary form and then purifying the product by eliminating phenols, tars, and other pyrogenic substances by alternate acid and alkali treatment.

ARTHUR WESLEY SMITH.